United States Patent [19]

Tossey

[11] 4,092,338

[45] May 30, 1978

[54] SLUDGE DISTRIBUTION NETWORK

[76] Inventor: De Fro Tossey, 900 Warrington Pl., Dayton, Ohio 45419

[21] Appl. No.: 763,050

[22] Filed: Jan. 27, 1977

[51] Int. Cl.² ............................................. B01D 21/02
[52] U.S. Cl. ...................................... 210/142; 210/4; 210/83; 210/167; 210/175; 210/195 S; 210/197; 210/519
[58] Field of Search .................. 210/2, 3, 4, 9, 14, 210/83, 84, 511, 512 R, 519, 525, 532 R, 533–535, 537, 538, 540, 88, 89, 97, 138, 141, 142, 167, 175, 194, 195 S, 197, 251; 137/625.11, 625.48

[56] References Cited

U.S. PATENT DOCUMENTS

| | | | |
|---|---|---|---|
| 2,085,916 | 7/1937 | Marra | 137/566 |
| 2,772,233 | 11/1956 | Nelson | 210/14 |
| 2,799,396 | 7/1957 | Belaskas | 210/221 R |
| 2,875,428 | 2/1959 | Griswold | 137/624.16 |
| 2,894,637 | 7/1959 | Schreiber | 210/519 |
| 3,000,398 | 9/1961 | Link | 137/624.16 |
| 3,141,000 | 7/1964 | Turner | 210/519 |
| 3,224,581 | 12/1965 | McKnight et al. | 210/525 |
| 3,242,071 | 3/1966 | Walker | 210/14 |
| 3,382,981 | 5/1968 | Hampton | 210/142 |
| 3,732,892 | 5/1973 | Bubula | 137/625.11 |
| 3,870,078 | 3/1975 | Apt et al. | 137/625.48 |
| 3,997,437 | 12/1976 | Prince et al. | 210/14 |

*Primary Examiner*—Frank Sever
*Attorney, Agent, or Firm*—Dybvig & Dybvig

[57] ABSTRACT

A sludge digester is equipped with a network of pipes leading to several separate effluent ports distributed around the base of the digester near its walls. During use, sludge undergoing active digestion within the digester is withdrawn from the digester and forcefully pumped through at least one of said pipes to flush or sweep material tending to settle from less active regions of the digester into other regions undergoing active digestion, thus to prevent accumulations of sludge which is not actively consumed by bacteria.

5 Claims, 4 Drawing Figures

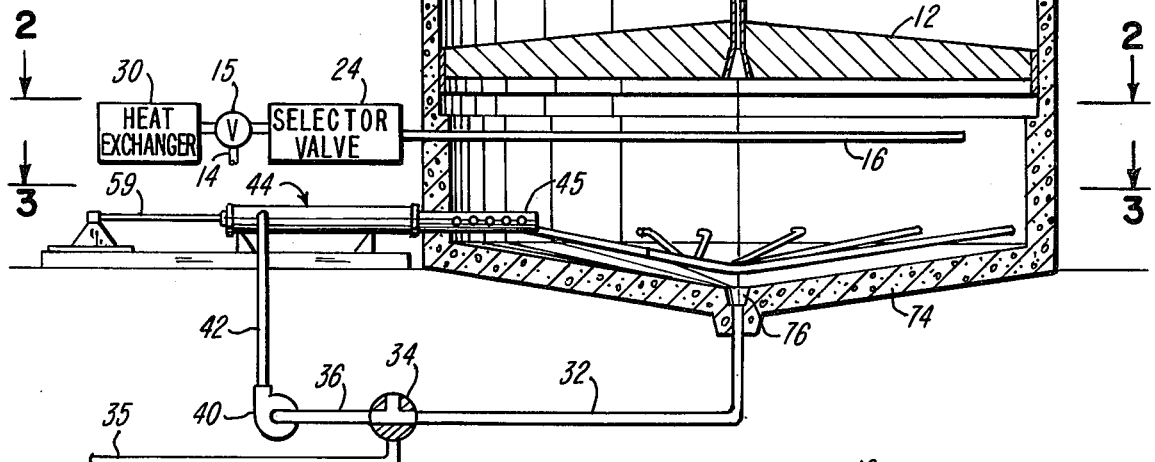
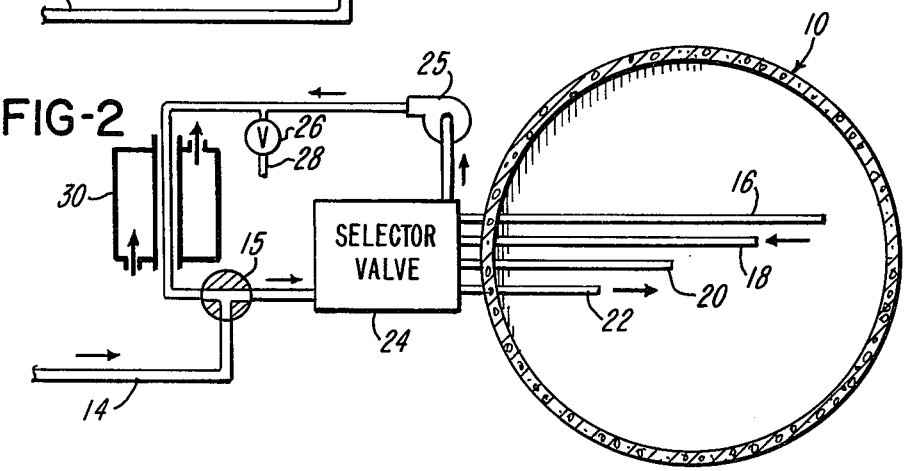
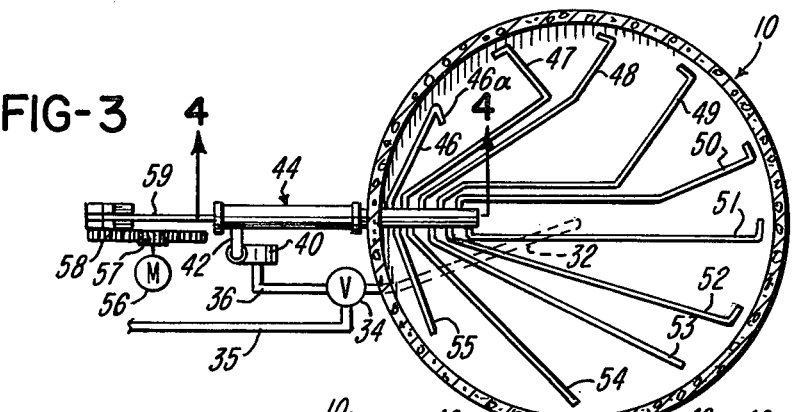
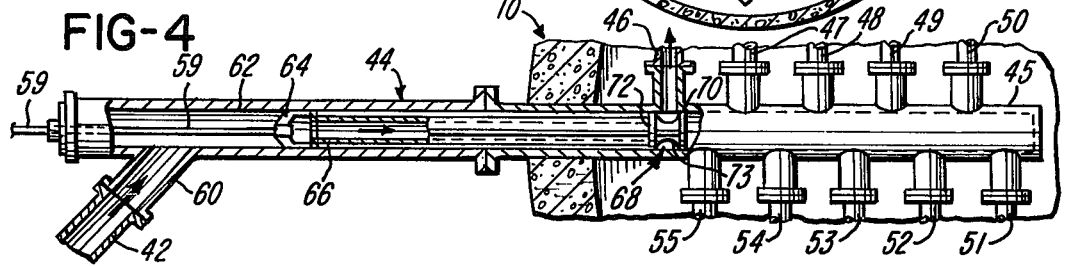

4,092,338

SLUDGE DISTRIBUTION NETWORK

BACKGROUND OF THE INVENTION

1. Field of the Invention

This invention relates to anaerobic sludge digesters and more particularly to a sludge digester having network means submerged therein for positively displacing sludge containing active bacteria to quiescent zones of the digester so as to insure active digestion of the entire digester contents.

2. Prior Art

In the bacteriological digestion of sludge, it has long been known that some mixing or agitation of the digester contents during the digestion process serves to distribute the raw sludge among the bacteria, to minimize settling of mineral solids or grit and to maintain uniform chemical and thermal conditions, thus to extend the area of active bacterial action throughout the available volume in the tank. Originally it was felt that the mixing caused by natural gasification and its resulting uplift was sufficient. More recently supplementary mechanical mixing has been used to enhance the benefits derivable from a good distribution of the raw sludge among the bacteria. Existing mixing and agitation systems can be divided into three basic types: mechanical stirrers, external impellers and gas uplifters. The mechanical stirrers have problems resulting from hair and other stringy solids tending to foul the moving parts in the tank. External impellers have a drawback in that they draw from or pump to only a few points in the digester, thus allowing short-circuiting to occur between inlet and outlet points of the digester and leaving large areas of unmoved sludge. Gas mixing systems have a similar drawback in that they tend to short-circuit and produce the desired mixing in only limited areas of the digester tank.

SUMMARY OF THE PRESENT INVENTION

In the present invention, a network of pipes leading to several ordinarily quiescent regions located near the base of a digester tank are utilized for a positive injection of sludge and active bacteria into the quiescent regions of the digester tank so as to minimize the tendency of the quiescent sludge and grit carried with the sludge to settle and accumulate in such quiescent areas. Pump means are utilized to forcibly circulate sludge being actively digested in the digester through the pipes to quiescent zones of the digester, thus disrupting sludge and grit tending to settle in the quiescent zones and, by delivering active bacteria to such quiescent zones, markedly extending the volume of the digester throughout which active digestion can occur. Since this mixing technique employs sludge moved through pipes rather than stirrers moved through sludge, fouling problems are minimized. Also, by reason of this technique, active bacteria are introduced into regions of the digester normally inaccessible to such bacteria, and a uniform distribution of desirable thermal and chemical characteristics is maintained throughout the digester.

An object of the present invention is to positively circulate actively digesting sludge from active areas of a sludge digester to quiescent areas of the sludge digester, thus to extend the volume of the digester throughout which active digestion occurs and to disrupt sludge and grit tending to settle in the otherwise quiescent zones of the digester.

Another object of the present invention is to provide a sludge distribution network including a pump, a distributor valve and piping which can be assembled into new or into pre-existing sludge digestion tanks for the purposes of minimizing the settling and accumulation of sludge and grit in quiescent zones of the digester and imparting to the digester a uniform distribution of thermal and chemical characteristics conducive to active sludge digestion.

BRIEF DESCRIPTION OF THE DRAWINGS

FIG. 1 is a section view of an anaerobic sludge digestion tank with a portion broken away, embodying the present invention.

FIG. 2 is a section view taken substantially along the line 2—2 of FIG. 1, this section view being arranged to illustrate only prior art structure.

FIG. 3 is a section view taken substantially along the line 3—3 of FIG. 1 and illustrating elements added to the prior art structure in accordance with the present invention.

FIG. 4 is a section view taken substantially along the line 4—4 of FIG. 3.

DESCRIPTION OF THE PREFERRED EMBODIMENT

The drawings illustrate a conventional type of anaerobic sludge digester to which a sludge distribution network in accordance with the present invention has been added. FIG. 2 is a section so taken as to illustrate only prior art structure. The prior art structure comprises a digester tank 10 closed by a floating roof 12 shown in FIG. 1, through which passes a vent stack 13 for venting gases, primarily methane, evolved as a by-product of the digestion process. In conventional installations, the tank 10 may be in the vicinity of 100 feet in diameter and the side walls of the tank in the vicinity of 30 to 40 feet high.

Sludge which is to be digested and which is ordinarily contaminated with an unavoidable concentration of nondigestible grit and the like is received from a primary treatment facility, not shown, for processing waste waters. The primary treatment facility is basically a separator in which settlable solids are separated from the sewage water, the settlable solids being retained for further processing in the digester and the sewage water being poured back into natural receivers such as lakes and streams. The settlable solids, sometimes referred to as raw sludge, are advanced to the anaerobic digester for the purpose of stabilizing the organic solids, thereby minimizing odors and other problems otherwise associated with the final disposition of such organic matter in the environment.

The raw sludge is transferred to the anaerobic digester 10 through a pipe 14. The flow of such sludge through the pipe 14 is regulated by a valve 15 so as to match the delivery of sludge to the digester with the capacity of the digester.

The digester is normally maintained substantially full of suitably heated sludge, and a pump 25 together with a conventional selector valve mechanism 24 is utilized to circulate some of the incoming new sludge through one or more of pipes 16, 18, 20 and 22, while simultaneously siphoning older sludge from within the tank through another one or more of such pipes to a heat exchanger 30. New sludge enroute to the digester under control of the valve 15 is blended with heated sludge from the heat exchanger 30 so as not to thermally shock the actively digesting bacteria within the digester tank. The pipes 16, 18, 20 and 22, which may be more or less in number than actually shown, thus serve the several functions of blending new sludge with old sludge being digested, preserving a temperature balance within the digester tank and agitating or mixing the sludge remaining in the tank. Also, since some of the partially digested sludge may be less dense than the water itself and thus may float toward the surface of the sludge residing in the digester tank, the pump 25 and its associated valve mechanism 24 may also be employed periodically to waste partially digested sludge tending to remain on the surface of the sludge within the digester through an outlet 28 regulated by a valve 26.

The digester is shown as having an outlet pipe 32 regulated by a valve 34 through which partially digested sludge is periodically discharged from the digester to a conduit 35 for ultimate disposal in the environment, such disposal typically involving deposition of the sludge in lagoons, landfills or the like, or the spreading of such sludge upon farmland, parks and the like. As previously indicated, sludge which is destined as waste may be withdrawn periodically by use of the circulating pipes 16-20 in conjunction with the outlet 28. It is also common in many digester facilities to have additional ports at different elevations from which sludge being digested may be withdrawn. Any such periodically withdrawn sludge will normally be actively digesting sludge because the periodic withdrawal causes readily movable active sludges as opposed to sedimented sludge to flow toward the withdrawal port.

Inasmuch as the digestion tank is operated on a continuing basis over periods extending throughout years, densely compacted piles of undigested quiescent sludge develop, and after extended periods such as five years it becomes necessary to withdraw the digester from service and cleanse the interior of the digester by shoveling away the densely compacted sludge and grit underlying quiescent areas of the digester. For this reason, it has been a common practice to operate a plurality of digesters in a tandem relationship whereby at least one digester may be shut down for purposes of cleansing while one or more other digesters continue to accept the new sludge which remains to be digested.

As appears in FIG. 1, and digester has a somewhat conically shaped floor 74 sloping to a centrally disposed pit 76 from which sludge being actively digested is periodically withdrawn through the outlet pipe 32 and discharged as waste through the conduit 35. In accordance with the present invention, a pipe 36 is caused to make a junction with the outlet pipe 32 at the valve 34 which is used selectively to waste sludge through the conduit 35 or to return sludge to the digester through the pipe 36. The pipe 36 communicates through a pump 40 to a pipe 42 which connects to a slide valve 44.

As shown in FIG. 4, the slide valve 44 consists of an elongated manifold member 45 to which communicates a network of distribution pipes or conduits 46, 47, 48, 49, 50, 51, 52, 53, 54 and 55. As evident in FIG. 3, the pipes 46–55 are arranged in a fan-like fashion so as to be spread upon the somewhat conical base or floor 74 which underlies the digester 10.

A motor 56 driving a pinion 57 is used to drive a rack 58 drivingly attached to an operating rod 59 employed to advance the slide valve 44 so as to direct sludge being pumped by the pump 40 through any one of the several distribution pipes 46–55. The sludge which passes through the pipe 42 can be seen to enter an elbow 60 integral with a housing 62 for the slide valve 44. Slidably disposed within the housing 62 is a vane member 64 attached to the operating rod 59, the sludge entering the housing 62 flowing past the vane 64 to enter a hollow tube 66 carrying at the distal end thereof a valve member 68 which travels within the manifold 45. The valve member 68 has a circular seal member 70 which slidably seals to the interior wall of the manifold 45. The valve member 68 also has a ring 72 which is open to permit sludge to flow through the valve member 68 alongside a central web 73 to whatever of the distribution pipes 46–55 is centered between the seal member 70 and the ring 72 of the valve member 68.

Indexing circuitry, or simply a manual switch, not shown, is employed in conjunction with the motor 56 to advance the valve member 68 so as to direct the sludge received from the pipe 42 to individual ones of the distribution pipes 46–55. It is not important for the purposes of the present invention that the indexing circuitry advance the valve member 68 successively to the distribution pipes in the order of the numbers applied to such pipes, and thus the indexing circuitry may simply advance the valve member 68 from left to right as appears in FIG. 4 to successively distribute sludge from the pipe 42 to the distribution pipes in the order of their distance from the lowest numbered pipe 46.

To allow a selection of the pipe through which the partially digested sludge will be returned from the pump 40 to the interior of the digester, it will be noted that the manifold connections of all of such pipes are staggered in such fashion that only one of the distribution pipes 46–55 may be selected.

Due to the fact that the floor of the digester is typically conical, appropriate bends have been shown in at least some of the pipes 46–55 to indicate that the pipes may be shaped in conformity with the floor of the digester so as to lie closely adjacent such floor. Such an arrangement of the pipes 46–55 is suitable when the present invention is added to a previously existing digester. Alternatively, when the present invention is to be included in a digester being newly constructed, the several pipes 46–55 may be at least partially submerged in the cement or other material forming the base of the digester.

It will be noted that the pipe 46 has an outlet 46a facing toward the interior of the digester. The pipes 47, 48, 49, 50, 51 and 52 have similar outlets facing generally circumferentially all in the same direction about the periphery of the digester and lying adjacent the outer wall of the digester. The pipes 53, 54 and 55 have generally straight outlets which are angularly inclined at various degrees to the circular wall of the digester so as to cause the sludge emanating from such pipes to swirl in a counterclockwise direction about the digester, thus complementing the pipes 47–52, all of which have outlets extending outwardly in the counterclockwise direction from such pipes. In regard to the orientation of the pipes, it will be appreciated that, if sludge were charged forcefully to all of such pipes at the same time, the consequence would be to induce a counterclockwise swirl of the sludge remaining in the digester, the single exception being the pipe 46, which would tend to divert the counterclockwise swirl toward the center of the digester.

However, the energy required for such a large sludge flow is not required for the purposes of the present invention and, accordingly, the distributor valve 44 operates to direct sludge from the pump 40 through only one of the distribution pipes at any one time, and thus a pronounced swirl cannot be expected. Furthermore, while it is sometimes desirable that sludge flow through the distribution pipes will induce some swirl, it is not considered important that the slide valve 44 operate in any particular sequential fashion so as to induce a swirl of the sludge being digested. Thus, FIG. 3 is intended to illustrate only one of many possible arrangements by which the sludge may be returned to the digestion tank, the directions in which the outlets for the various distribution pipes face being preferentially selected to sweep sedimental sludge and grit from floor areas of the tank in which sedimentation would otherwise be expected to occur. Experience has shown that the tendency of the water residing in the digestion tank to settle sludge and grit is greatest where the sludge is not actively mixed and hence where the sludge is closest to the outside wall of the digestion tank. Accordingly, the distribution pipes are preferentially terminated near the outside wall of the digestion tank, but the directions in which the outlet openings face may be varied to suit the needs of the particular tank under consideration.

In the preferential mode of operation, new sludge being received at the pipe 14 is progressively admixed to old sludge passing out of the heat exchanger 30 in the same fashion as described in reference to prior practices and furthermore is distributed diametrically across the digestion tank by pipes such as the pipes 16, 18, 20 and 22 in the same fashion as has been heretofore common, thus to at least partially distribute the sludge and heat diametrically across the body of the tank. In accordance with the present invention, however, sludge which has been partially processed and is in a position to be discharged from the digestion tank through the pipe 32, or any other selected port, is diverted by an appropriate operation of the valve 34 to the pump 40 and then, by selective operation of the slide valve 44, is returned to a selected area of the digestion tank so as to sweep away from that region of the tank sedimentation tending to there develop. It is preferred that the slide valve 44 be operated on a regular basis such as once per hour to successively divert the sludge being recycled progressively to each one of the distribution pipes, thereby systematically disrupting any sedimentation tending to occur near the outlet of each of the distribution pipes.

Sludge which is extracted from actively digesting regions of the digestion tank is thus systematically returned through the distribution pipes to less actively digesting areas in which grit and sludge tend to settle, thus to disrupt the settlement of such grit and sludge and to keep the undigested sludge in a region of biological activity where the sludge is more efficiently digested. Such redistribution of sludge in the digester offers the further advantage of maintaining substantially uniform temperature and chemical conditions throughout the volume of the digester, thus to further promote the digestion of sludge.

Although the preferred embodiments of the present invention have been described, it will be understood that various changes may be made within the scope of the appended claims.

Having thus described by invention, I claim:

1. In a sludge digestion facility of the type in which a body of sludge contained within a tank is digested in said tank by bacteria, said body comprising a plurality of quiescent zones near the bottom of said tank, the improvements including a plurality of pipes mounted within said tank, each pipe having an effluent opening into one of said quiescent zones adjacent the floor of said tank, said openings peripherally disposed and spaced apart within said tank, pump means for pumping partially digested sludge derived from said tank, and valve means in communication with said pump means for distributing said partially digested sludge sequentially to only one of said pipes at a time, and for a period sufficient to enable partially digested sludge emerging from the opening of said one of said pipes into its respective quiescent zone, to substantially entirely displace materials which have settled in said respective quiescent zone during that period when partially digested sludge was not emerging from the opening of said one of said pipes.

2. The improvement of claim 1 wherein said digestion tank is a generally circular tank and the openings of said plurality of pipes are spaced circumferentially about the base of said tank.

3. The improvement of claim 2 wherein at least one of said pipes has a portion immediately upstream of its effluent opening extending circumferentially about said tank.

4. The improvement of claim 1 including a discharge pipe extending from said tank for discharging partially digested sludge from said tank, a valve for closing said discharge pipe, said pump means communicating between said discharge pipe and said valve means.

5. In a sludge digestion facility of the type in which a body of sludge contained within a tank is digested in said tank by anaerobic bacteria, said body comprising a plurality of quiescent zones near the bottom of said tank, said tank having a discharge port through which partially digested sludge is periodically discharged to make room for incoming new sludge, the improvements including pipes mounted within said tank and having plural effluent openings adjacent the floor of said tank, each of said openings, opening into a respective one of said quiescent zones, a manifold having plural outlet ports each connecting separately to one of said pipes, pump means having communication between said manifold and said discharge port for forcing sludge being discharged from said tank through said manifold, sequential fluid switch means, valve means responsive to said switch means for sequentially distributing sludge forced to said manifold by said pump means through a single one of said outlet ports, into its respective quiescent zone, for a period sufficient to enable sludge emerging from said single one of said ports to substantially entirely displace materials which have settled in said respective quiescent zone during that period when sludge was not emerging from said single one of said ports, each of said effluent openings submerged below the level of sludge residing in said tank.

* * * * *